US005478273A

United States Patent [19]
Ives

[11] Patent Number: 5,478,273
[45] Date of Patent: Dec. 26, 1995

[54] CRAB POT

[75] Inventor: Harvey Ives, Blaine, Wash.

[73] Assignee: HiTec Potworks, Inc., Blaine, Wash.

[21] Appl. No.: 427,795

[22] Filed: Apr. 26, 1995

[51] Int. Cl.$^6$ .......................... A01K 69/08; A01K 69/04
[52] U.S. Cl. .................................................. 452/1; 43/100
[58] Field of Search ............................ 452/1; 43/61, 60, 43/100, 101; 220/485

[56] References Cited

U.S. PATENT DOCUMENTS

| | | |
|---|---|---|
| 2,716,304 | 8/1955 | Taylor . |
| 3,440,758 | 4/1969 | Prince . |
| 4,905,405 | 3/1990 | Hendricks ................................. 43/100 |
| 5,088,230 | 2/1992 | Moritz ...................................... 43/100 |
| 5,168,653 | 12/1992 | Wyman et al. .......................... 43/100 |
| 5,218,781 | 6/1993 | Miller ...................................... 43/100 |
| 5,259,809 | 11/1993 | Rainey, Jr. ............................... 452/1 |
| 5,299,972 | 4/1994 | Heffernan et al. ....................... 452/1 |

FOREIGN PATENT DOCUMENTS 22294  7/1917  Denmark .

Primary Examiner—Willis Little
Attorney, Agent, or Firm—Hughes, Multer and Schacht

[57] ABSTRACT

A crab pot having improved yield. A traditional commercial crab pot comprises a trigger structure that rotates between open and closed positions. The crabs enter the trap by pushing trigger members inwardly as the crabs pass through a trap opening. The trigger members are prevented from swinging outwardly, so crabs should not be able to leave through the trap opening. To bias the trigger structure into the closed position, the trigger structure comprises a counterweight member that biases the trigger members into a position where they span the trap opening and prevent egress of crabs. A protection structure is provided which prevents crabs from interfering with the operation of the trigger structure. The protection structure prevents the crabs from interfering either with the portions of the trigger members which extend below the trap opening and/or the counterweight member located above the trap opening. The protection structure thus may take the form of either a stirrup structure which receives the bottom ends of the trigger members or a hood which extends over and protects the counterweight member. The stirrup structure and the hood structure do not interfere with normal operation of the trigger structure. Preferably, both a hood structure and a stirrup structure are used at the same time.

20 Claims, 7 Drawing Sheets

CRAB POT

TECHNICAL FIELD

The present invention relates to pots for trapping crabs and the like and, more particularly, to crab pots having gated openings that allow ingress but not egress of the crabs.

1. Background of the Invention

Crabs are commercially harvested by placing crab pots in areas where crabs are present. Bait that is attractive to crabs is placed in these crab pots and crabs enter the pots in search of the bait. The crab pots are enclosure-type trapping devices that crabs may enter but, in theory, cannot leave.

During use, the pots are tied to a buoy using a line. The buoy floats above the pot to mark the location of the pot. After a suitable period of time has passed, the crabber locates the pot using the buoy and lifts the pot using the line.

As crab pots are immersed in salt water and submitted to fairly extreme conditions during use, their design has been kept fairly simple and rugged. The basic design of a crab pot has remained unchanged for many decades.

2. Prior Art

A professional patentability search conducted on behalf of the applicant uncovered the following references: U.S. Pat. No. 5,259,809 issued Nov. 9, 1993, to Rainey, Jr.; Danish Pat. No. 22294; U.S. Pat. No. 2,716,304 issued Aug. 30, 1955 to Taylor; and U.S. Pat. No. 3,440,758 issued Apr. 29, 1969 to Prince.

Of the foregoing references, the patents to Taylor and Prince relate to trapping devices specifically adapted to trap crabs. The Rainey, Jr. patent discloses a trapping device adapted to trap shrimp. The Danish patent appears to show a trapping device similar in overall structure to the other devices but, to the applicant's knowledge, does not relate to crabs.

OBJECTS OF THE INVENTION

From the foregoing, it should be clear that one primary object of the invention is to provide improved methods and devices for trapping crabs.

Another more specific object of the present invention is to obtain methods and apparatus for trapping crabs that exhibit a favorable mix of the following characteristics:

(a) reduces the likelihood that legal size crabs, once within the pot, will escape from the pot;

(b) reduces the likelihood that crabs within the pot will block entry of other crabs into the pot;

(c) reduces the likelihood that trigger wires of the pot will be stuck in the open position;

(d) reduces the likelihood that foreign materials will open the trigger wires;

(e) can be retrofitted to existing pots to improve the ability of these existing pots to catch crabs;

(f) allow the weight of the counterbalance attached to the trigger wires to be increased;

(g) reduces the likelihood that the trigger wires will be damaged; and (h) can be easily and inexpensively manufactured and installed.

SUMMARY OF THE INVENTION

These and other objects are obtained by the present invention, which basically comprises a crab trap in which one or more protection structures are located within the trap to prevent crabs from interfering with or opening a trigger structure employed to allow ingress but not egress of crabs into the pot.

In particular, commercial crab traps often employ a trigger structure that comprises two trigger members that extend across a trap opening and a counterweight member which is connected to the trigger members in a way that forces these trigger members into a closed position in which they span the trap opening.

An implicit assumption in the design of crab pots is that because crabs have no intelligence per se, they will not figure out how to open the trigger structure once they are inside the trap. This assumption may be generally valid, but it does not take into account the fact that the crabs may accidentally move around inside the trap in a manner that results in the trigger structure being placed in its open position. At this point, either the crab who has accidentally opened the trigger structure may escape or other crabs nearby may escape.

Additionally, while a crab may not open the trigger structure, the crab may interfere with its operation such that the trigger structure is kept in a closed position that does not allow the entry of any additional crabs. While a crab pot usually has two and sometimes four openings, the crab cannot be expected to find the other opening if one is blocked. This is particularly true because crabs tend to move in the direction of currents; if the crab is frustrated from entering one opening of the trap, it may simply move past the trap until it can no longer detect the bait.

The protection structures of the present invention are arranged in one or preferably two places within the crab pot to prevent crabs from accidentally interfering with the operation of the trigger structure. First, a hood structure may be placed over the counterweight portion of this trigger structure in order to prevent crabs from interfering with the movement of this trigger structure. In particular, a crab may sit on top of the trigger structure, which would prevent the trigger structure from being moved into its open position, and thus prevent crabs from entering the pot. Additionally, it may be possible for a crab moving around within the trap to grip the counterweight portion in a manner that raises the trigger members. If the crab grips the counterweight portion and then stops moving, the trigger structure may be placed in its open position, allowing the other crabs within the pot to escape.

The hood structure thus comprises a piece of rigid or semi-rigid material that is placed over the counterweight member in a manner that significantly reduces the likelihood that a crab will interfere with the movement of this counterweight member.

Second, a stirrup structure may be provided to protect the bottom ends of the trigger members. Normally, these members extend past the opening and down into the trap itself. A crab moving radially inwardly within the trap may hook these ends on its shell in a manner that causes the trigger structure to move into the open position. At this point, that crab may be able to exit through the trap opening, or another crab nearby may also be able to exit through the trap opening.

The stirrup structure comprises a pair of cup-like stirrups that are configured to define channels that receive the ends of the trigger wires. These stirrups allow crabs passing into the pot through the trap opening to displace the trigger members to place the trigger structure into the open position; however, the stirrups prevent a crab within the trap from moving in the same direction and accidentally opening the trigger structure from below.

Additionally, the trigger structure is relatively loosely arranged within the pot. It can be slid side-to-side a short distance at its upper end, and the lower end of the trigger members can be displaced to the side by approximately one inch. Accordingly, a crab pressing against these trigger members and arranged at an angle to the trap opening can possibly squeeze out of the opening past the trigger members. The hood structure and the stirrup structure both can be arranged to prevent this sideways movement of the trigger members. Accordingly, legal size crabs are much less likely to squeeze back out of the trap opening by sliding the trigger members sideways.

Ideally, both a hood structure and a trigger structure will be used in one trap.

DETAILED DESCRIPTION OF THE INVENTION

Figure 1:
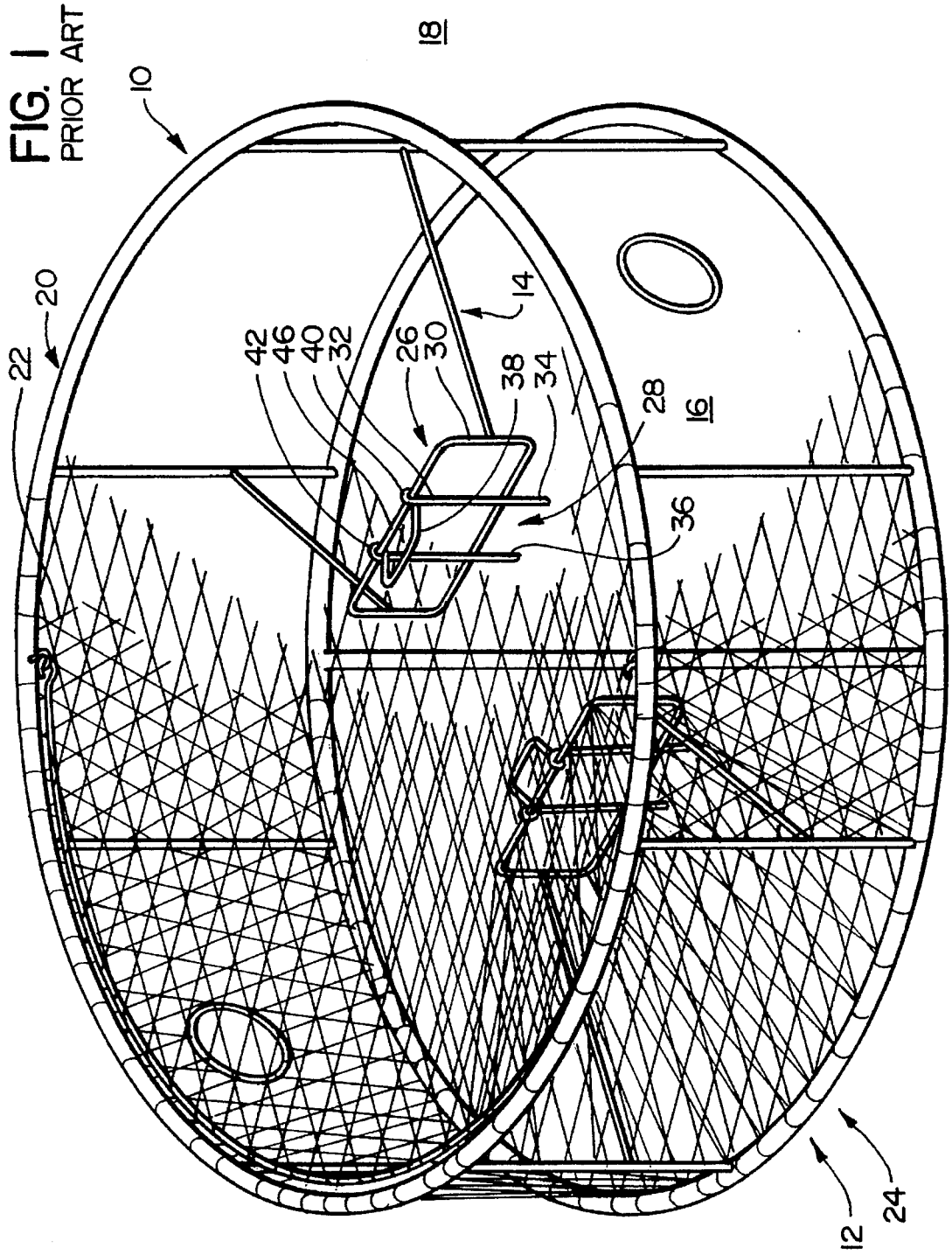
FIG. 1 is a perspective view of a prior art crab pot in which mesh frame material has been partially removed for clarity of illustration.
Figure 2:
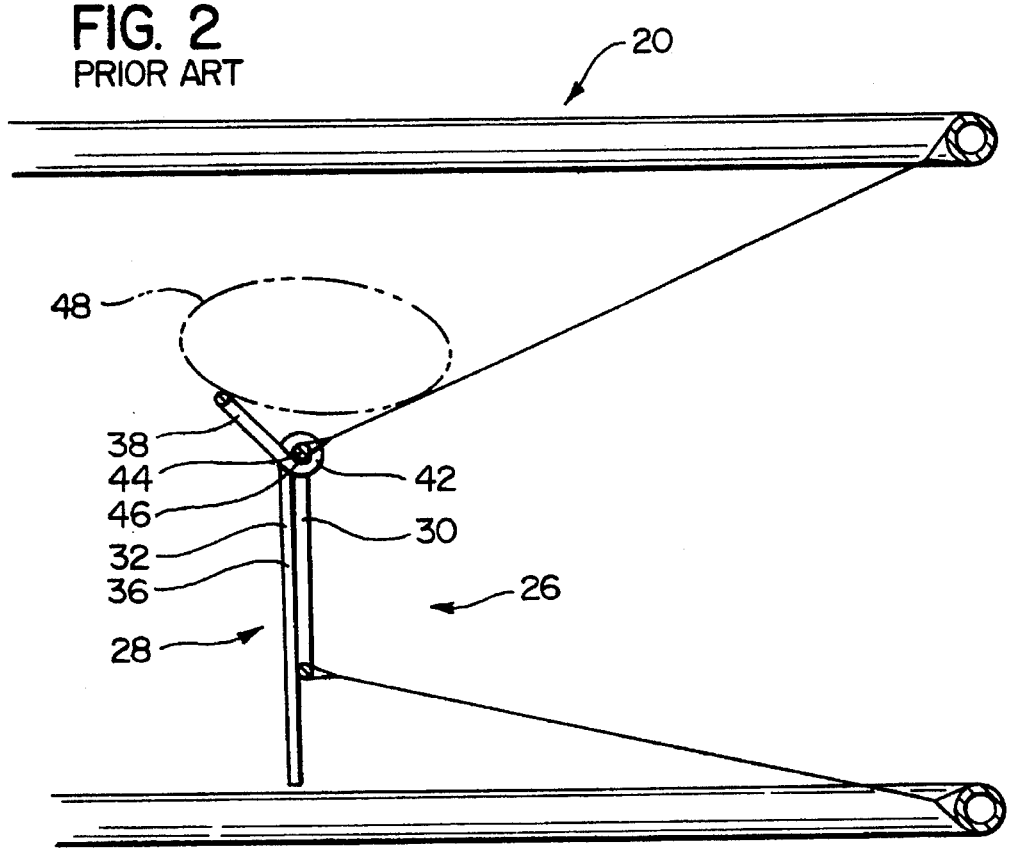
FIGS. 2 and 3 are side section views of the crab pot shown in FIG. 1 depicting certain problems associated with the operation of such a crab pot.
Figure 3:
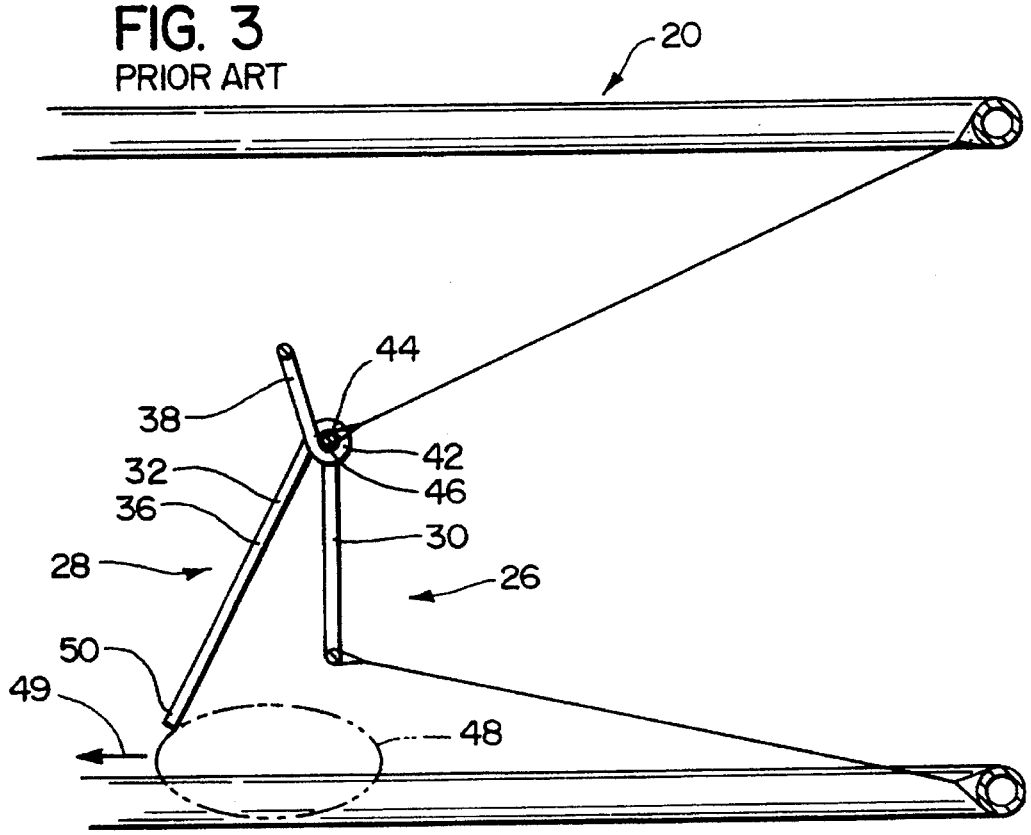

Referring initially to FIGS. 1, 2, and 3 of the drawing, an exemplary prior art crab pot 10 will initially be described. The present invention will be described with reference to FIGS. 4–10 after the introductory discussion of the prior art.

Formed in the pot 10 are funnels 12 and 14. An interior of the pot 10 is indicated by reference character 16, while an exterior thereof is identified by reference character 18. The conventional crab pot 10 basically comprises a frame portion 20, frame material 22 which is arranged on the frame (partly shown in FIG. 1 for clarity), openings 24 and 26, and a trigger structure 28 that allows crabs to enter the pot 10 through the opening 26 but is designed to prevent crabs from exiting the pot 10 through the opening 26.

The construction, operation, and use of the crab pot 10 is well known in the art and will not be described in detail herein. However, several aspects of the prior art trap 10 will be described in further detail to help the reader understand the construction, operation, and use of the present invention.

In particular, the frame 20 comprises an opening structure 30 which defines the trap opening 26. The opening structure 30 is basically rectangular in shape, being shorter in height than it is in width.

The trigger structure 28 is formed from a single piece of rigid wire 32 that is wrapped around the opening structure 30 to define first and second trigger members 34 and 36 and a counterweight member 38. More particularly, the wire 32 is wrapped around the opening structure 30 at a loop 40 located between the first trigger member 34 and the counterweight member 38. The trigger wire 32 is also wrapped around the opening structure 30 at a loop 42 arranged between the counterweight structure 38 and the second trigger member 36.

This arrangement is shown in greater detail in FIGS. 2 and 3. Comparing FIGS. 2, and 3, it can be seen that the trigger structure 28 configured as described can rotate between a closed position (FIG. 2) and an open position (FIG. 3) about a rotation axis 44 defined by an upper portion 46 of the opening structure 30. Additionally, it can be seen that the counterweight member 38 inwardly extends at an angle relative to vertical; this allows gravity to act on the trigger members 34 and 36 and the counterweight 38 to bias the trigger structure 28 into the closed position shown in FIG. 2.

Referring now for a moment more particularly to FIG. 2, schematically depicted therein at 48 is a crab that is resting on the counterbalance member 38. If the crab 48 should sit in this position, it could interfere with movement of the counterweight member 38 and prevent a crab from passing through the trap opening 26 into the interior of the trap 10. The possibility that the crab 48 will be able to prevent entry of additional crabs is enhanced by the affect of gravity on the trigger structure 28 and the fact that the length of the counterweight member 38 provides leverage that assists the crab 48 in holding the trigger structure 28 in the closed position. Clearly, if the situation depicted in FIG. 2 should occur, crabs may not be able to enter the pot 10 through the trap opening 26.

FIG. 3 depicts another situation which may very well occur with a number of crabs moving around within the pot 10. A crab within the pot 10 may move in a radially inward direction indicated by arrow 48 in FIG. 3. In so doing, the shell of the crab 46 may catch a lower end 50 of the trigger member 36 in a manner that causes the trigger structure 28 to rotate into the open position as shown. In this open position, the crab 46 itself may escape through the trap opening 26 or another crab within the trap 10 may pass through the opening 26.

It should be noted that the situations depicted in FIGS. 2 and 3 are, perhaps contrary to expectations, quite likely to happen. The crabs are very mobile and agile in their environment. Even within the trap, they will tend to roam around before ultimately settling in one position. Additionally, when pulled, a trap may contain as many as 20 or 30 crabs. As the number of crabs within the trap increases, the likelihood that one or more of these crabs will interfere with the operation of the trigger structure 28 also increases.

Figure 4:
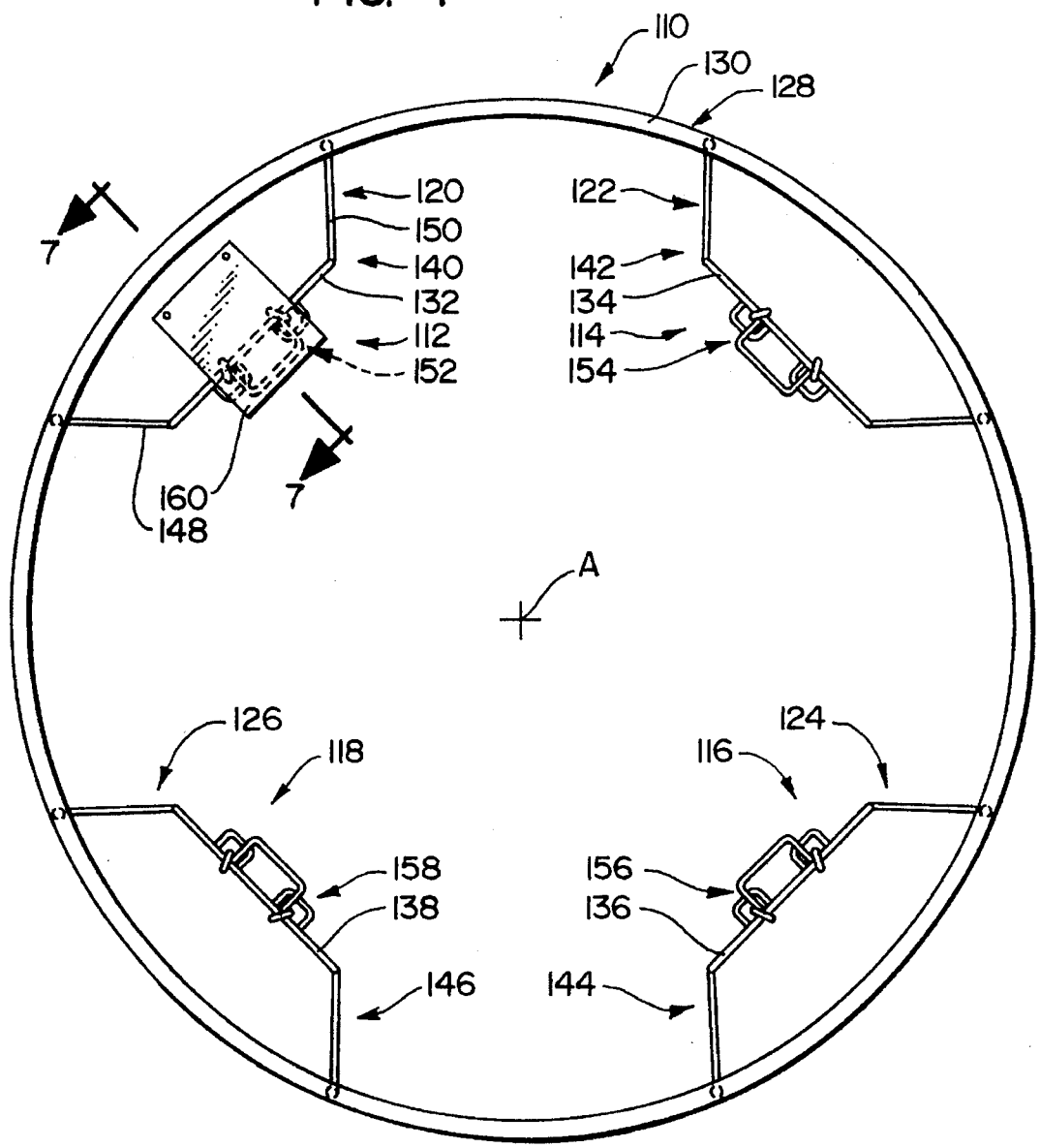
FIG. 4 is a top view of a crab pot employing the principles of the present invention.

Referring now to FIG. 4, depicted at 110 therein is a crab pot constructed in accordance with, and embodying, the principles of the present invention. In FIG. 4, the frame material forming a part thereof the crab pot 110 is not shown to provide a clearer picture of the operation and construction of the present invention. It should be clear, however, that such frame material would be required to obtain a functioning crab pot.

Additionally, the crab pot 110 is shown with four trap openings 112, 114, 116, and 118 rather than with two openings as in the prior art pot 10 described above. Given that four such openings are employed in the pot 110, the funnels 120, 122, 124, and 126 associated therewith are made significantly shallower than those of the prior art crab pot 110.

The principles of the present invention are, however, equally applicable to the prior art crab pot 10 described above. The pot 110 comprises a frame 128 having a perimeter structure 130 and opening structures 132, 134, 136, and 138 associated with each of the trap openings 112, 114, 116, and 118, respectively. Each of the opening structures 132–138 are spaced radially inwardly towards a center axis A of the crab pot 110. Brace structures 140, 142, 144, and 146 maintain the opening structures 132–138 in the appropriate position. Referring only to the brace structure 140 for the purposes of clarity, it can be seen than each of these brace structures 140–146 comprises a first brace member 148 and a second brace member 150 which extend between the perimeter structure 130 and the opening structure 132.

Arranged adjacent to each of the trap openings 112–118 is a stirrup structure identified by reference characters 152, 154, 156, and 158. Also associated with each of these trap openings 112–118 is a hood structure, although only one such hood structure 160, associated with the trap opening 112, is shown in FIG. 4 for purposes of clarity.

Figure 5:
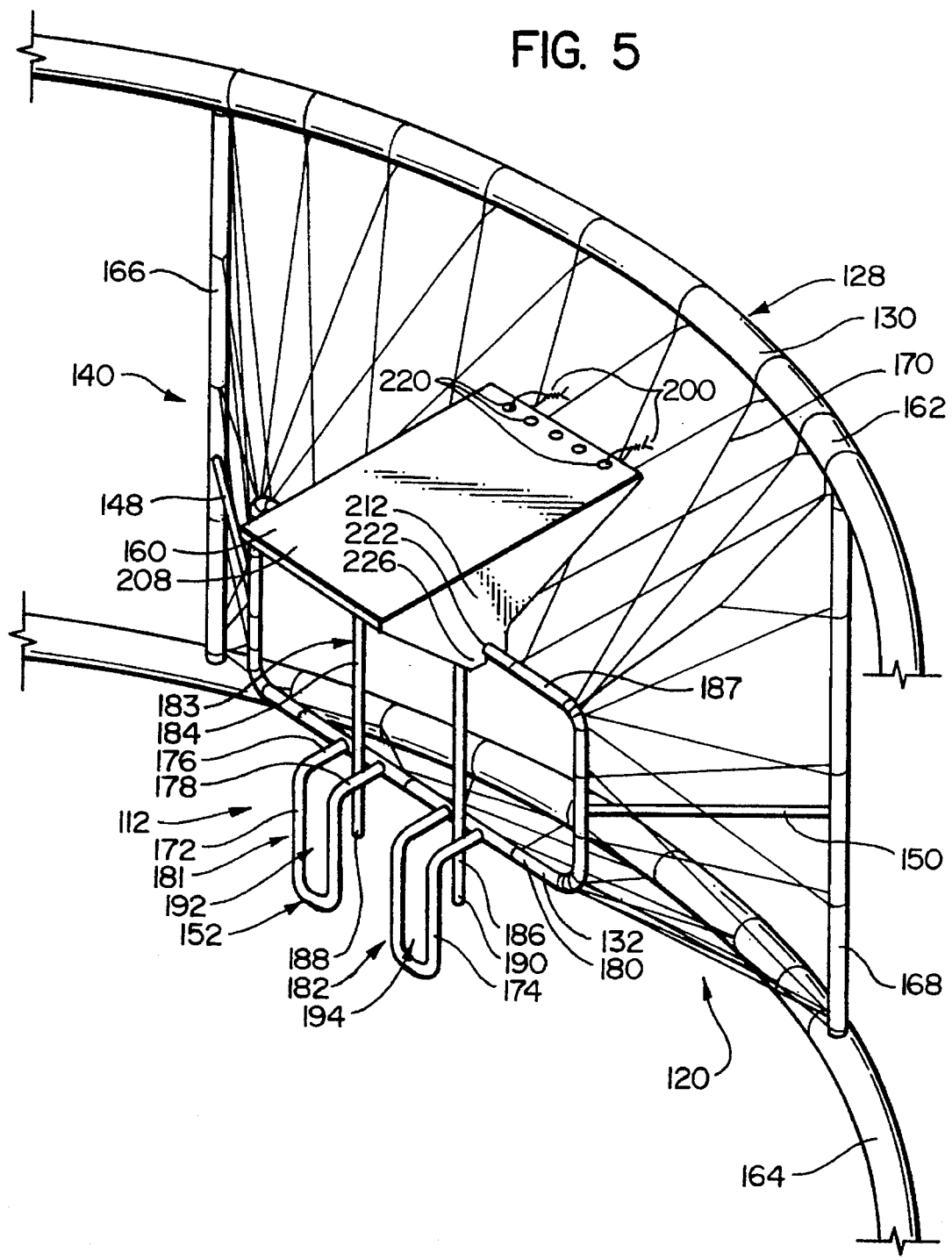
FIG. 5 is a perspective view of one trap opening of the crab pot depicted in FIG. 4 showing details of the operation of the present invention.
Figure 6:
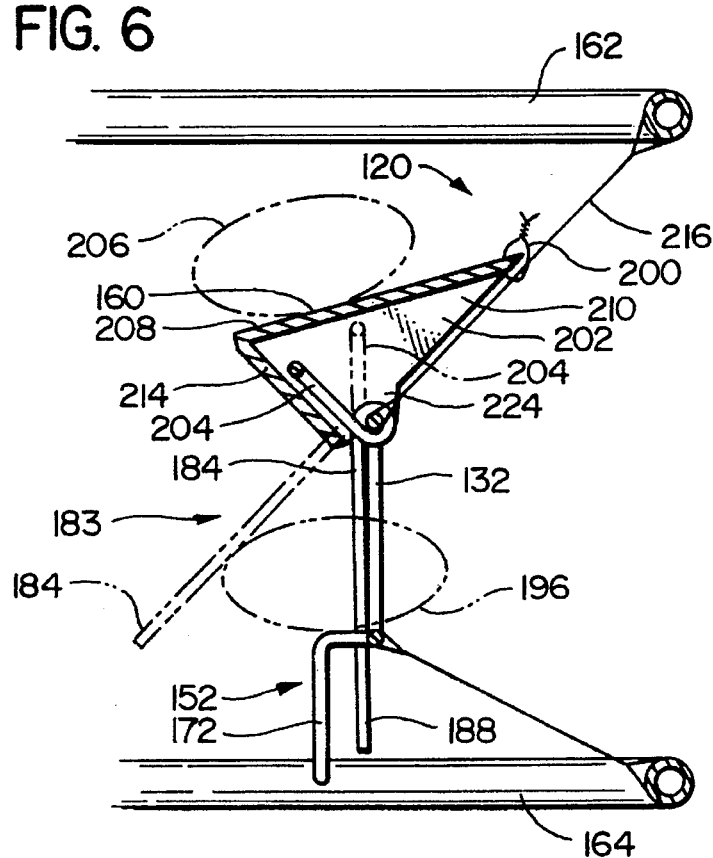
FIGS. 6 and 7 are side partial cut-away views taken along lines 7—7 in FIG. 4 which show the operation of the present invention under different possible circumstances.

Referring now to FIG. 5, the stirrup structure 152 and hood structure 160 associated with the trap opening 112 are shown in further detail. FIG. 3 also shows that the perimeter structure 130 comprises upper and lower ring members 162 and 164 and first and second vertical spacing members 166 and 168.

From FIG. 3, it can be seen that the brace members 148 and 150 of the brace structure 140 extend between the vertical spacing member 166 and the opening structure 132 and the spacing member 168 and the structure 132, respectively. FIG. 3 additionally shows frame material 170 that extends between the peripheral structure 130 and the opening structure 132 to define the funnel 120.

Referring initially to the stirrup structure 152, the exemplary structure 152 comprises first and second stirrup members 172 and 174. These stirrup members 172 and 174 are essentially identical and only the structure 172 will be described herein in detail.

The stirrup member 172 comprises a single piece of rigid wire in a U-shaped configuration, with upper ends 176 and 178 bent backwards such that they extend generally orthogonally from the plane of the U. These ends 176 and 178 are securely attached to a bottom portion 180 of the opening structure 132 such that a channel defining portion 180 of the stirrup member 172 is arranged in a substantially vernical plane and spaced radially inwardly from the opening structure 132 towards the axis A. A similar channel defining portion 182 is formed by the stirrup member 174.

The pot 110 comprises a trigger structure 183 for allowing crabs to enter, but preventing crabs from leaving, the pot 110. The trigger structure 183 comprises trigger members 184 and 186 that span the trap opening 112 in a manner the same as the trigger members 34 and 36 of the prior art crab pot 10. The trigger members 184 and 186 rotate about a rotation axis defined by an upper portion 187 of the opening structure 132. Lower ends 188 and 190 of these trigger members 184 and 186 extend below the lower portion 180 of the opening structure 132.

Additionally, the stirrup members 172 and 174 are spaced along the opening structure lower portion 180 such that, under normal conditions, the lower ends 188 and 190 of the trigger members 184 and 186 enter into channels 192 and 194 defined by the channel defining portions 180 and 182 of these stirrup members 172 and 174. These channels 192 and 194 are generally parallel to each other and extend along lines extending generally radially outwardly from the center axis A of the pot 110.

Figure 8:
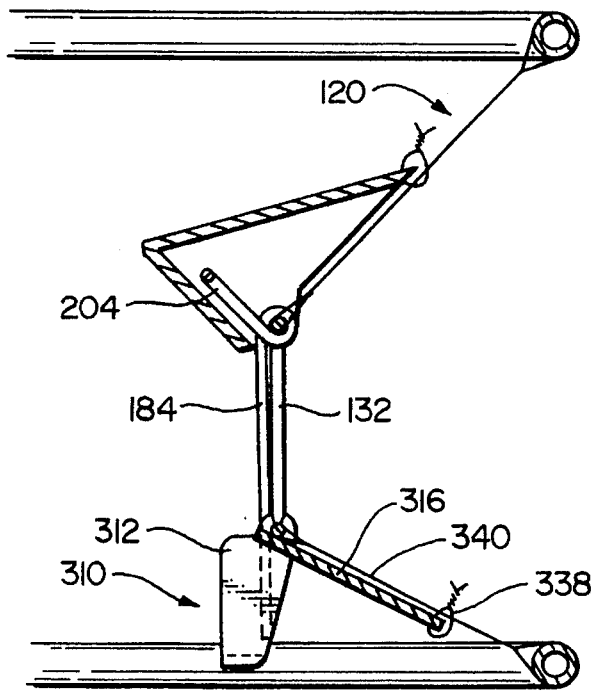
FIG. 8 is a side partial cut-away view showing the present invention in a slightly different form.

The stirrup structure 152 solves certain of the problems identified above in reference to the prior art crab pot 10. Initially, as shown in FIG. 8, the stirrup member 172 will prevent a crab 196 located under the funnel 120 from moving radially inwardly towards the center axis A against the lower end 188 of the trigger member 184. The stirrup member 172 thus prevents the crab 196 from opening the trigger structure 183 formed by the trigger members 184 and 186.

Further, the stirrup members 172 and 174 act on the lower ends 188 and 190 of the trigger members 184 and 186 to prevent these members from the pushed from side-to-side along the bottom portion 180 of the opening structure 132. By preventing the spread or sideways movement of these trigger members 184 and 186, the stirrup members 172 and 174 prevent crabs from escaping simply by exhibiting a lateral force on the trigger member lower ends 188 and 190.

Figure 7:
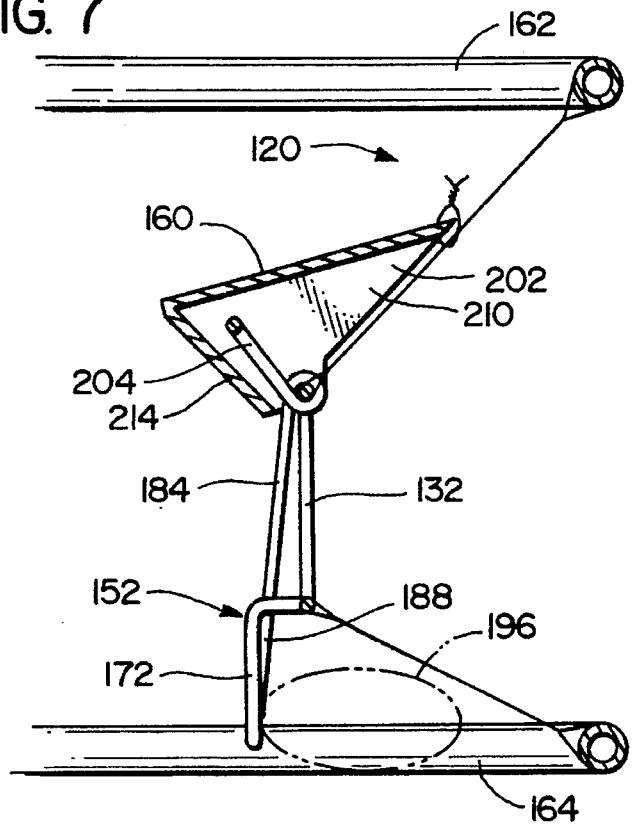

Referring now to the hood structure 160, it can be seen from FIGS. 3 and 7 that this structure 160 engages the upper portion 187 of the opening structure 130 and is attached by stainless wire 200 to the frame material 170 defining the funnel 120.

As shown perhaps best in FIGS. 7 and 8, the hood structure defines an interior chamber 202 in which a counterbalance member 204 of the trigger structure 130 is contained.

The exact shape and dimensions of the hood structure 160 are not critical as long as the chamber 202 defined thereby allows the trigger structure to rotate between closed (solid lines) and open (broken lines) positions as shown in FIG. 7. The applicant has determined that a cavity 202 generally in the shape of a triangular extrusion (see FIGS. 6 and 7) is suitable for this purpose because it allows the required motion of the trigger structure 183 while providing convenient connections to the opening structure upper portion 187 and funnel 120.

The hood structure 160 prevents crabs from interfering with the operation of the counterbalance member 204 of the trigger structure 183. For example, as shown in FIG. 7, a crab 206 that climbed on top of the funnel 120 would simply rest on an upper surface 208 of the hood structure 160 and would not interfere with the movement of the trigger structure 183. Additionally, end walls 210 (FIG. 7) and 212 (FIG. 3) and an inner wall 214 prevent a crab from reaching underneath the upper wall 208 to interfere with the operation of the trigger structure 183.

For ease of manufacturing, the exemplary hood structure 160 does not comprise an outer wall opposing the upper and inner walls 208 and 214; instead, the hood structure 160 relies on the frame material 170 forming an upper portion 216 of the funnel 120 to protect the cavity 202. While the frame material 170 will not provide the same degree of protection as the hood structure 160, the chances are much lower that a crab on the outside of the pot 110 will interfere with the operation of the trigger structure 183 because the concentration of crabs outside the pot 110 will be much lower than that inside the pot 110.

The exemplary hood structure 160 is a single piece made out of injection molded plastic. However, clearly other materials that are resistant to the corrosive affects of salt water may be used. These materials include wood, grounded stainless steel, steel.

Additionally, a plurality of holes 220 are formed in the upper surface 208; these holes 220 allow the stainless wire 200 to be placed at an appropriate location to secure the hood structure 160 to the frame material 170. Similarly, notches 222 (only one shown in FIG. 3) are formed in lower portions 224 and 226 of the side walls 210 and 212. These notches 222 are sized, dimensioned, and located to engage the upper portion 187 of the opening structure 132. These notches 222 positively engage the upper portion 187 such that a substantial amount of force is required to remove the hood structure 160 from the opening structure 132. Therefore, while the notches 222 allow the hood structure 160 to be removed if desired, these notches 222 engage the opening structure upper portion 187 in a manner that prevents the hood structure 160 inadvertently knocked off or removed from the upper portion 187.

Referring now for a moment to FIG. 11, the hood structure 160 is depicted therein from the perspective of the center axis A of the pot 110 looking out through the trap opening 112. In FIG. 11, the side walls 210 and 212 of the hood structure 160 and the counterweight member 204 of the trigger structure 183 are shown in broken lines. FIG. 11 also shows that the trigger structure 183 further comprises loop portions 226 and 228. The loop portion 226 is located between the first trigger member 184 and the counterweight member 204, while the second loop portion 228 is located between the counterweight member 204 and the second trigger member 186.

In this context, it can be seen that the trigger structure 183 is formed from a single piece of wire and that the loop portions 226 and 228 extend around the upper portion 187 of the opening structure 132. Therefore, referring now for a moment to FIGS. 7, 8, and 10, it can be seen that gravity will act on the counterbalance member 204 and trigger member 184 to hold the trigger structure 183 in its closed position. However, without the hood structure 60, only the frame material 170 keeps the entire trigger structure 183 from moving along the opening structure upper portion 187. Since the frame material 170 comprises fairly significant open spaces and is somewhat flexible, without the hood structure 160 the entire trigger structure 183 can move for up to an inch along the upper portion 187 of the opening structure 132.

However, as shown in FIG. 11, the side walls 210 and 212 of the hood structure 160 are spaced immediately adjacent to the loop portions 226 and 228 of the trigger structure 183. Friction between the notches 222 and the upper portion 187 hold the hood structure 160 onto the opening structure upper portion 187. This friction inhibits movement of the hood structure 160 and therefore the trigger structure 183 along the rotation axis defined by the upper portion 187. This movement is further restricted by the fact that the hood structure 160 is attached to the funnel 120 by the stainless wires 200. The hood structure 160 thus substantially reduces the likelihood that a crab will create a large enough opening to walk through by applying a force to one of the trigger members 184 and 186 that moves the entire trigger structure to one side.

Figure 9:
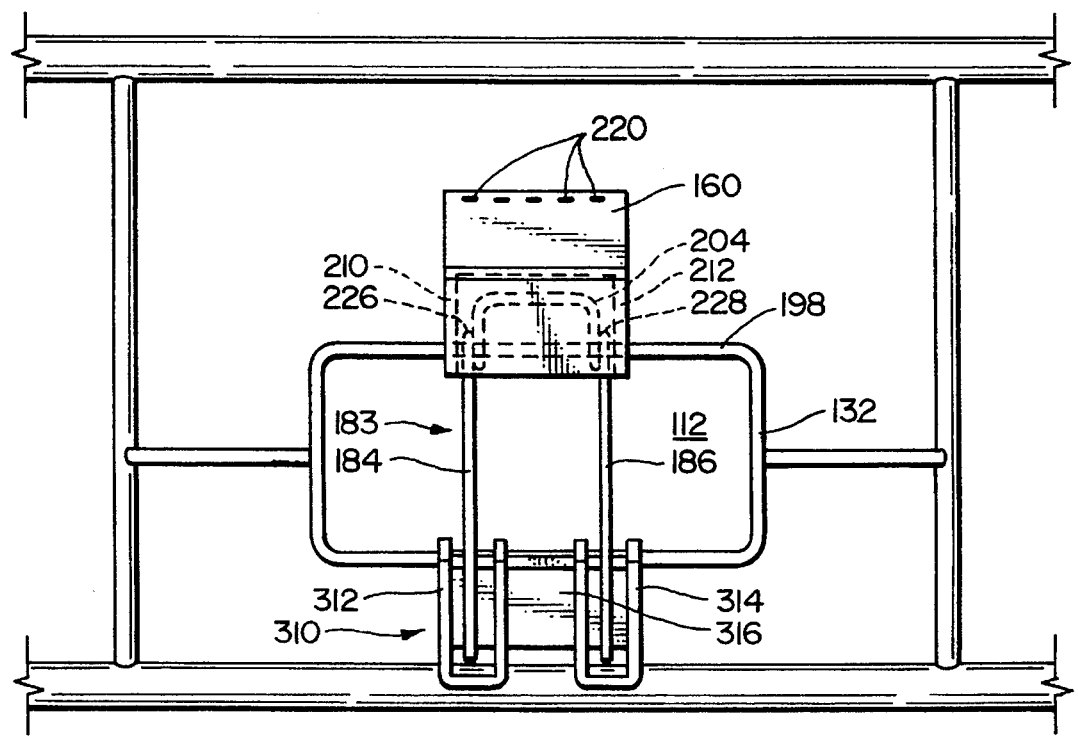
FIG. 9 is an interior view showing the present invention as depicted in FIG. 8.
Figure 10:
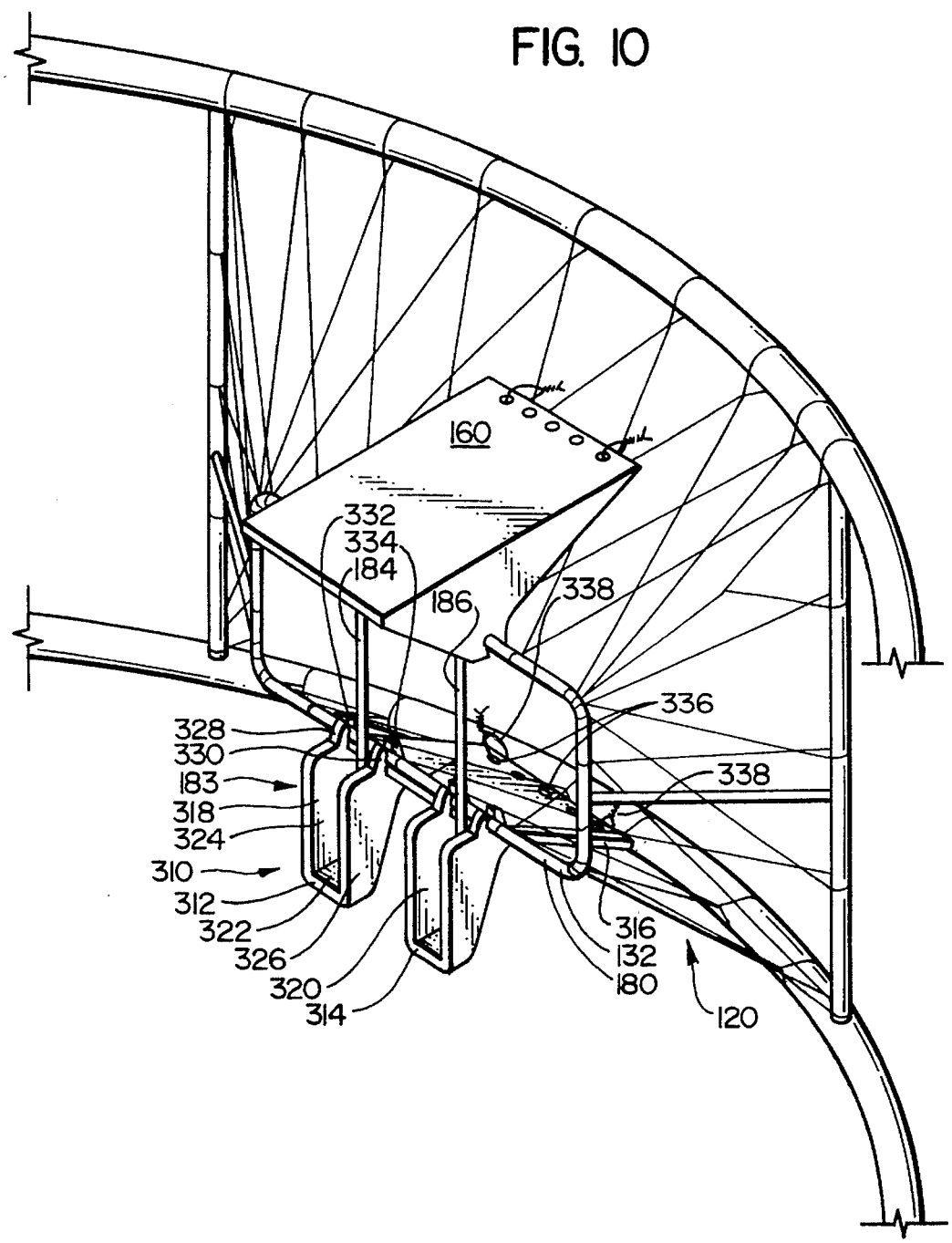
FIG. 10 is a perspective view showing details of operation of the present invention as shown in FIGS. 8 and 9.

Referring now to FIGS. 8, 9, and 10, yet another exemplary stirrup structure 310 is depicted therein. This stirrup structure 310 operates in the same basic manner as the stirrup structure 152 described above, but is made out of injection molded plastic rather than rigid wire.

The stirrup structure 310 basically comprises first and second stirrup members 312 and 314, and a fastening plate 316. As shown in FIG. 9, the stirrup members 312 and 314 have a generally U-shaped configuration when looking from inside the trap. The trigger members 184 and 186 are received in channels 318 and 320 formed by the stirrup members 312 and 314. These channels 318 and 320 allow free movement of the trigger members 184 and 186 as the trigger structure 183 moves between the opened and closed positions.

The stirrup members 312 and 314 are the same, and only one of these will be explained below with the understanding that this explanation applies to the other.

The stirrup structure 312 comprises a bottom wall 322 and side walls 324 and 326. The channel 318 is defined by these walls 322, 324, and 326. Formed at the upper portion of the side walls 324 and 326 are attachment members 328 and 330. Grooves 332 and 334 are formed by the attachment members 328 and 330. These grooves 332 and 334 are sized and dimensioned to create a positive engagement with the lower portion 180 of the opening structure 132.

The fastening plate 316 is attached to both of the stirrup members 312 and 314 such that these channels 318 and 320 defined by the structures 312 and 314 are spaced from each other the same distance as that between the trigger members 184 and 186. Additionally, a plurality of holes 336 are formed in the attachment plate 316.

In operation, the notches in the attachment members engage the lower portion 180 of the opening structure 132 and stainless wire is employed to attach the attachment plate 316 to a lower portion 340 of the funnel 120. Properly installed, the stirrup structure 310 is mounted such that the trigger members 184 and 186 are received in the channels 318 and 320. The trigger structure 183 operates normally, but interference with the motion thereof by crabs underneath the funnel 120 is substantially eliminated.

The stirrup structure 310 is particularly adapted to be injected molded out of plastic, although other materials that are resistant to corrosion in a marine environment may be used.

With either the hood structure 160 or the stirrup structure 310, the exact shape of the structure is not important, as long as it can: (a) be securely attached to the opening structure 132 and funnel 120; (b) does not interfere with the normal movement of the trigger structure 183; and (c) prevents crabs within the pot 110 from interfering with normal operation of the trigger structure 183.

It should also be clear that the hood structure 168 and stirrup structures 158 and 310 may be arranged on a conventional crab pot such as that shown at 10 in FIGS. 1–3. Additionally, these structures 160, 158, and 310 may be installed on the pot at the factory, or may also be shipped in a retrofit kit for existing pots.

It should be clear from the foregoing that the present invention may be embodied in other specific forms without departing from the essential characteristics thereof. The present embodiments are therefore to be considered in all respects as illustrative and not restrictive, the scope of the invention being indicated by the appended claims rather than by the foregoing description; all changes which come within the meaning and range of equivalency of the claims are therefore intended to be embraced therein.

I claim:

1. An apparatus for trapping crabs, comprising:

a frame comprising a peripheral structure;

frame material arranged on the frame to define an interior chamber, the frame material being adapted to prevent passage of crabs therethrough;

at least one trap opening in the frame material through which crabs may pass;

a trigger structure arranged to rotate about a rotation axis between a closed position and an open position, where the trigger structure prevents passage of crabs from the interior chamber through the trap opening when in the closed position and allows passage of crabs through the trap opening when in the open position, the trigger structure having a first portion arranged to span the trap opening when the trigger structure is in the closed position and a second portion that acts on the first portion to bias the trigger structure into the closed position; and hood means for extending over the second portion of the trigger structure to inhibit the ability of crabs to interfere with movement of the second portion of the trigger structure.

2. An apparatus as recited in claim 1, in which:

the frame comprises an opening structure that extends around the perimeter of the trap opening; and the hood means comprises first and second attachment means for attaching the hood means to the opening structure of the frame.

3. An apparatus as recited in claim 1, further comprising:

a funnel through which crabs must pass to reach the trap opening; and fixing means for fixing the hood means relative to the funnel.

4. An apparatus as recited in claim 2, further comprising:

a funnel through which crabs must pass to reach the trap opening; and fixing means for fixing the hood means relative to the funnel.

5. An apparatus as recited in claim 4, in which the funnel is formed from web material adapted to prevent passage of crabs therethrough.

6. An apparatus as recited in claim 1, in which the frame material is web material.

7. An apparatus as recited in claim 1, in which:

the first portion of the trigger structure comprises first and second trigger members that rotate about the rotation axis;

the second portion of the trigger structure comprises a counterweight member that is connected to the trigger members such that gravity acts on the counterweight member to bias the trigger structure into the closed position, where rotation of the trigger members about the rotation axis causes the counterweight member to rotate about the rotation axis; and the hood means comprises a hood structure adapted to extend over the counterweight member in a manner that allows the counterweight member to rotate about the rotation axis.

8. An apparatus as recited in claim 7, in which the frame comprises an opening member defining the trap opening and the trigger structure comprises a trigger wire that engages the opening member and has:

two end portions that form the first and second trigger members of the trigger structure; and a middle portion that forms the counterweight member of the trigger structure; wherein the hood structure that extends over the middle portion of the trigger wire.

9. An apparatus as recited in claim 8, in which the hood structure engages the trigger wire in a manner that inhibits movement of the trigger wire along the rotation axis.

10. An apparatus as recited in claim 1, further comprising stirrup means arranged adjacent to the trap opening for inhibiting the ability of crabs to interfere with movement of the first portion of the trigger structure.

11. An apparatus for trapping crabs, comprising:

a frame comprising a peripheral structure;

frame material arranged on the frame to define an interior chamber, the frame material being adapted to prevent passage of crabs therethrough;

at least one trap opening in the frame material through which crabs may pass;

a trigger structure arranged to rotate about a rotation axis between a closed position and an open position, where the trigger structure prevents passage of crabs from the interior chamber through the trap opening when in the closed position and allows passage of crabs through the trap opening when in the open position, the trigger structure having a first portion arranged to span the trap opening when the trigger structure is in the closed position and a second portion that acts on the first portion to bias the trigger structure into the closed position; and stirrup means arranged adjacent to the trap opening for inhibiting the ability of crabs to interfere with movement of the first portion of the trigger structure.

12. An apparatus as recited in claim 11, in which:

the frame comprises an opening structure that extends around the perimeter of the trap opening; and the stirrup means comprises a plurality of attachment means for attaching the stirrup means to the opening structure of the frame.

13. An apparatus as recited in claim 11, further comprising:

a funnel through which crabs must pass to reach the trap opening; and fixing means for fixing the hood means relative to the funnel.

14. An apparatus as recited in claim 11, in which:

the frame comprises an opening structure that extends around the perimeter of the trap opening, the opening structure having an upper portion substantially coextensive with the rotation axis and a lower portion;

the first portion of the trigger structure comprises a plurality of trigger members, where lower ends of the trigger members extend below the lower portion of the opening structure; and the stirrup means comprises a stirrup structure for each of the trigger members, where each stirrup structure is arranged to receive the lower ends of the trigger members in a manner that allows the trigger structure to rotate between the open and closed position but reduces the ability of crabs within the interior chamber to rotate the trigger structure from the closed position into the open position.

15. An apparatus as recited in claim 14, in which:

the trigger members rotate in a first direction when the trigger structure moves from the closed position and into the open position and in a second direction opposite to the first direction when the trigger structure moves from open position into the closed position; and each stirrup structure is configured and arranged within the interior chamber to prevent crabs within the interior chamber from rotating the trigger members in the first direction while allowing crabs entering the interior chamber through the trap opening to rotate the trigger members in the first direction.

16. An apparatus as recited in claim 11, in which:

the first portion of the trigger structure comprises a plurality of trigger members each having a lower end; and the stirrup means engages the lower ends of the trigger members when the trigger structure is in the closed position in a manner that prevents movement of these ends along a spreading axis substantially parallel to the rotation axis.

17. A method of trapping crabs comprising the steps of:

providing a crab pot having a trap opening through which crabs may pass;

arranging a trigger structure on the crab pot adjacent to the trap opening such that the trigger structure rotates about a rotation axis between an open position in which crabs may pass through the trap opening and a closed position in which the trigger structure inhibits passage of crabs through the trap opening;

attaching a protection structure to the crab pot adjacent to the trap opening such that the protection structure reduces the likelihood that crabs within the pot will (a) interfere with movement of the trigger structure between the open and closed positions and (b) cause the trigger structure to rotate into the open position.

18. A method as recited in claim 17, in which:

the trigger structure comprises a counterweight portion arranged above the trap opening to bias the trigger Structure into the closed position; and the protection structure comprises a hood extending over the counterweight portion of the trigger structure, where the hood substantially prevents crabs from interfering with movement of the counterweight portion of the trigger structure.

19. A method as recited in claim 17, in which:

the trigger structure comprises a plurality of trigger wires arranged to span the trap opening when the trigger structure is in the closed position; and the protection structure comprises a plurality of stirrups that receive lower ends of the trigger wires, where the stirrups substantially prevent crabs within the pot from causing the trigger wires to rotate into the open position.

20. An apparatus for trapping crabs comprising:

a crab pot having a trap opening through which crabs may pass;

a trigger structure arranged on the crab pot adjacent to the trap opening such that the trigger structure rotates about a rotation axis between an open position in which crabs may pass through the trap opening and a closed position in which the trigger structure inhibits passage of crabs through the trap opening;

a protection structure attached to the crab pot adjacent to the trap opening such that the protection structure reduces the likelihood that crabs within the pot will (a) interfere with movement of the trigger structure between the open and closed positions and (b) cause the trigger structure to rotate into the open position.

* * * * *